April 28, 1970 M. J. CLARK ET AL 3,509,377

LOW NOISE POWER SWITCHING CIRCUITS

Filed May 18, 1967 2 Sheets-Sheet 1

INVENTORS
MICHAEL J. CLARK
JOHN G. SIMEK
BY John C Black
ATTORNEY

United States Patent Office 3,509,377
Patented Apr. 28, 1970

3,509,377

LOW NOISE POWER SWITCHING CIRCUITS

Michael J. Clark, Binghamton, and John G. Simek, Endwell, N.Y., assignors to International Business Machines Corporation, Armonk, N.Y., a corporation of New York

Filed May 18, 1967, Ser. No. 639,479
Int. Cl. H03k *17/00*
U.S. Cl. 307—25 4 Claims

ABSTRACT OF THE DISCLOSURE

Low power controlled rectifiers (e.g., silicon-controlled rectifiers) assure the turn-on of high power controlled rectifiers only when the level of the alternating-current voltage supply is close to zero volts. Noise in the form of current spikes is thereby minimized.

BACKGROUND OF THE INVENTION

In data processing apparatus the logic circuits of the central processing unit are becoming extremely sensitive to noise in the form of current spikes. With improvements in the semiconductor technology, logical devices in the central processing unit are becoming extremely high speed and are switched in response to very low level input signals. Consequently, they are becoming more sensitive to noise which is frequently originated in apparatus external to the central processing unit cabinet. A significant part of this noise originates in the control circuits for heaters, motors and the like. Noise from these control circuits has been significantly reduced in recent years by the substitution of semiconductor switches, e.g., silicon-controlled rectifiers, for electromagnetically operated contacts. Since the controlled rectifiers can be turned off only when the supply voltage reaches approximately zero volts, there is substantially no noise in the form of current spikes produced when the rectifiers are turned off. However, if the rectifiers are turned on in response to control signals at an instant in time when the level of the voltage across the rectifier and its associated load is relatively high, one or more current spikes of appreciable levels can be produced.

Suggestions have been made to minimize this turn-on noise by assuring turn-on of the rectifiers only when the supply voltage is at a relatively low level. The invention of the present application is directed to improvements in the control circuits for the power rectifiers.

SUMMARY OF THE INVENTION

In one preferred form of the invention a pair of power rectifiers is connected in parallel with opposite polarities so as to couple alternate half cycles of an alternating-current supply to an associated load. A switch means is provided for short circuiting the control electrodes of the rectifiers when the load is to be maintained deenergized. When the switch is opened, the controlled rectifiers are capable of being energized in series with the load. Preferably, the switch control is electrically isolated from the A.C. supply for safety reasons. A low power controlled rectifier is connected in parallel with the switch and functions to prevent the power rectifiers from being energized upon opening of the switch until the supply voltage reaches the zero volt cross-over point and begins to increase from zero. This is achieved by causing the low power controlled rectifier to be energized whenever the switch is closed. When either the switch or the silicon-controlled rectifier is closed, it shunts the control circuits of the high power rectifiers. The low power rectifier turns off only when the supply voltage reaches a level close to zero volts, thus preventing turn-on of the high power rectifiers during that cycle, even if the switch opens during the cycle. The high power rectifiers are then free to become energized only after the low power rectifier is deenergized and the switch is open for the next cycle.

The foregoing and other objects, features and advantages of the invention will be apparent from the following more particular description of preferred embodiments of the invention, as illustrated in the accompanying drawings.

DESCRIPTION OF THE PREFERRED EMBODIMENTS

Figure 1:
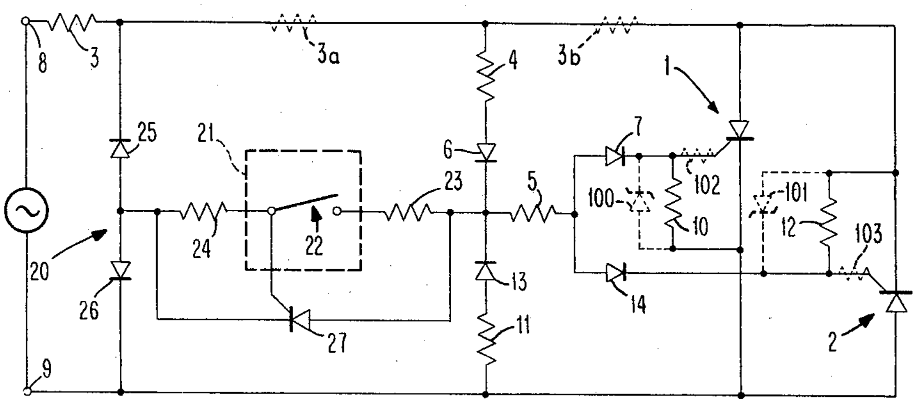
FIG. 1 is a schematic diagram illustrating one form of the invention utilizing oppositely poled, parallel-connected controlled rectifiers.

The embodiment of FIG. 1 includes a pair of oppositely poled, parallel-connected high speed silicon-controlled rectifiers 1 and 2 which are connected in series with a load 3. The control electrode of the rectifier 1 is energized over a circuit including resistors 4, 5 and 10 and diodes 6 and 7 to turn the rectifier 1 on when a first supply terminal 8 is positive relative to a second supply terminal 9. The control electrode of the rectifier 2 is energized over a circuit including resistors 11, 5 and 12 and diodes 13 and 14 to turn on the rectifier 2 when the terminal 9 is positive relative to the terminal 8. The resistors 10 and 12 function to assure better stability in the off state of each rectifier and render the rectifiers less sensitive to noise.

A control circuit 20 is provided for effectively short circuiting the control circuits of the rectifiers 1 and 2 at times when the load is to remain deenergized. For example, in a typical application, a thermostatically controlled electric heater cyclically energizes its heating elements to maintain a constant temperature in a heating chamber or oven. The system includes a thermostat 21, illustrated diagrammatically, having contacts 22. The contacts 22 are connected to the junction between the diodes 6 and 13 by way of a resistor 23. The contacts are also connected to the supply terminals 8 and 9 by way of a resistor 24 and diodes 25 and 26. A controlled rectifier 27 is connected in parallel with the series circuit comprising the resistors 23 and 24 and the contacts 22.

In operation, it will be assumed that the contacts 22 are initially closed and that the power supply is energized and connected to the terminals 8 and 9. If we assume that the terminal 8 is relatively positive, a circuit including the load 3, resistor 4, diode 6, resistor 23, contacts 22, resistor 24 and diodes 26 is completed for turning on the rectifier 27. With the rectifier 27 energized, the voltage at the junction between the diodes 6 and 13 equals the voltage drop across the diode 26 and the rectifier 27 or approximately one volt. This one-volt potential is not sufficiently high to permit forward biasing of the diode 7 and the control electrode of the rectifier 1 with sufficient current to turn the rectifier 1 on.

The rectifier 27 turns off when the supply voltage returns to zero volts. During the next half cycle with the contacts 22 to be closed, a second circuit for again turning on the silicon-controlled rectifier 27 is completed by way of resistor 11, diode 13, resistor 23, contacts 22, resistor 24 and diode 25. Thus, even though the rectifier 27 turns off each time that the supply potential goes through zero volts, it, nevertheless, turns on rapidly as soon as the voltage supply rises above zero volts. Thus the rectifiers 1 and 2 are maintained cut off and only a small current flows through the load 3. Resistors 4 and 11 are dimensioned so as to maintain this current at a sufficiently low level.

When the contacts 22 are opened, for example in response for a demand for more heat, the rectifier 27 remains energized until the supply voltage crosses through zero volt. At this time the rectifier 27 becomes deenergized and the proper rectifier 1 or 2 will be energized during the succeeding half cycle, irrespective of its polarity. In addition, the turn-on of the rectifiers is assured to occur at a desired low voltage level. Dimensioning of the resistors 4, 5, 10, 11 and 12 determines the voltage level at which the rectifiers 1 and 2 are turned on.

To cause turn-on of the rectifiers 1 and 2 at the lowest suitable voltage levels, the resistors 4 and 11 must be made as small as possible. However, since the resistors 4 and 11 determine the level of the leakage currents through the load when the rectifier 27 is energized, these resistors must not be selected to be so low as to cause excessive leakage currents through the load 3.

Using the following values, one implementation of FIG. 1 achieved turn-on of the rectifiers at approximately six volts when a 208 volts supply was connected to a one hundred ohms resistive load.

| Resistors: | Ohms |
|---|---|
| 4, 11 | 350 |
| 10, 12 | 1000 |
| 5 | 500 |
| 24 | 2200 |
| 23 | 50 |

It will be appreciated that only one rectifier 1 or 2 is required if the voltage supply is pulsating direct current. A thermistor or other suitable switch may be substituted for the contacts 22.

Figure 2:
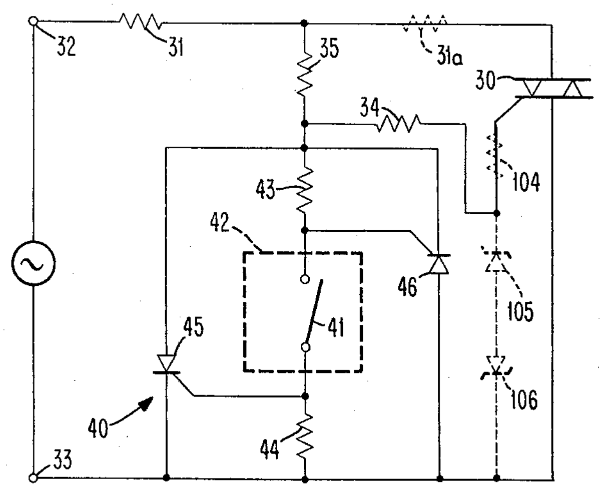
FIG. 2 is a schematic diagram of a second embodiment utilizing a triac, a bi-directional controlled rectifier.

In FIG. 2 a bi-directional controlled rectifier, i.e., a triac 30, is connected in series with a load 31 and supply terminals 32 and 33. The control electrode of the triac is connected to the input terminal 32 by way of resistors 34 and 35. A voltage of either polarity applied to the control electrode of the triac will cause turn-on of the triac to its high conductivity state. Hence, as an alternating-current supply voltage is applied to the terminals 32 and 33, the triac will be turned on at a low voltage level and will subsequently be turned off when the voltage goes through zero volts.

A control circuit 40 prevents energization of the triac when contacts 41 of a controlled switch 42 are closed. The contacts 41 are connected to the junction between the resistors 34 and 35 by way of a resistor 43 and are connected to the supply terminal 33 by way of a resistor 44. A pair of oppositely poled, low power controlled rectifiers 45 and 46 is connected in parallel with the series circuit including resistors 43 and 44 and contacts 41.

When the contacts 41 are closed, the resistors 35, 43 and 44 provide an energizing circuit for the rectifiers 45 and 46. When the terminal 32 is positive relative to the terminal 33, a voltage is produced across the resistor 44 having a polarity required for turn-on of the rectifier 45. Thus, when the terminal 32 reaches a predetermined positive level, the rectifier 45 is turned on to connect the terminal 33 to the junction between the resistors 34 and 35 to prevent turn-on of the triac 30. When the terminal 33 is sufficiently positive with respect to the terminal 32, the voltage across the resistor 43 causes turn-on of the rectifier 46 to connect the terminal 33 to the junction between the resistors 34 and 35, preventing turn-on of the triac.

If the contacts 41 are opened while either rectifier 45 or 46 is conducting, the rectifier remains conductive until the supply voltage across terminals 32 and 33 reaches zero volts. During this period, the triac cannot turn on because its control electrode circuit is shunted to the terminal 33.

As in the previous embodiment, the values of the resistors 35, 43 and 44 are selected so as to achieve turn-on of the triac only at a selected low voltage level while preventing excess current leakage through the load 31 when the triac is maintained in its deenergized state. One implementation of FIG. 2, which was utilized to control the operation of a 208 volt, single phase, alternating-current motor, achieved switching of the motor on and off substantially at the zero voltage cross-over points, used the following values.

| Resistors: | Ohms |
|---|---|
| 34, 43, 44 | 500 |
| 35 | 2200 |

Figure 3:
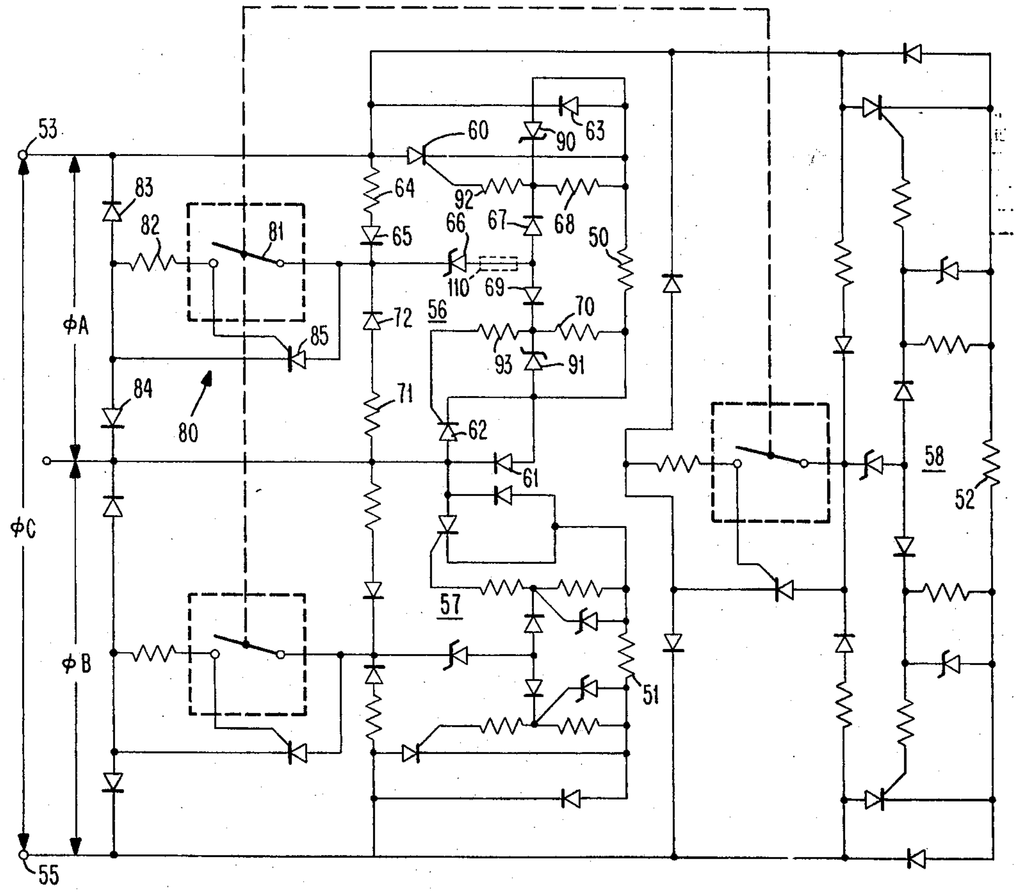
FIG. 3 is a schematic diagram illustrating a third embodiment of the invention specifically adapted to control a three-phase supply.

In the embodiment of FIG. 3, three loads 50, 51 and 52 are connected respectively to phases A, B and C of a three-phase power supply (not shown) connected to terminals 53, 54 and 55. Control circuits 56, 57 and 58 are provided respectively for loads 50, 51 and 52.

Each of the control circuits 56, 57 and 58 is identical and, therefore, only circuit 56 will be described in detail. The circuit 56 includes a first energizing path for the load 50 comprising a controlled rectifier 60 and a diode 61. This path is effective for energizing the load 50 when the terminal 53 is positive relative to the terminal 54. A second energizing path is provided for the load 50 when the terminal 54 is positive relative to the terminal 53, this path comprising a controlled rectifier 62 and a diode 63.

The energizing circuit for the control electrode of the rectifier 60 comprises resistor 64, diode 65, Zener diode 66, diode 67, resistor 68, load 50, and diode 61.

The energizing path for the control electrode of the rectifier 62 comprises resistor 71, diode 72, Zener diode 66, diode 69, resistor 70, load 50 and diode 63.

The energizing path portions comprising diode 67, resistor 68 and diode 69, resistor 70 are in parallel. Consequently, the control electrode-cathode junctions of the rectifiers 60 and 62 are forward biased to their low impedance states together. However, during any half cycle of supply voltage, the anode-cathode terminals of only one of the rectifiers will be biased for conduction and the other rectifier will be biased to its high impedance state.

If the terminal 53 is positive relative to the terminal 54, the voltage at the control electrode of the rectifier 60 turns the rectifier on to connect the load 50 across the terminals 53 and 54 over a series circuit including the rectifier 60, the load, and the diode 61. When the terminal 54 is positive relative to the terminal 53, the rectifier 62 is turned on to complete a series circuit extending from the terminal 54 to the terminal 53 by way of the rectifier 62, load 50 and diode 63.

In order to maintain the load 50 selectively deenergized, a control circuit 80 is provided for short circuiting the energizing circuits of the control electrodes of the rectifiers 60 and 62. The circuit 80 includes a pair of contacts 81 which, when closed, completes a circuit from the junction between the diodes 65 and 72 and the terminals 53 and 54 by way of a common resistor 82 and respective diodes 83 and 84. A low power controlled rectifier 85 is connected in parallel with the series circuit comprising the contacts 81 and the resistor 82.

When the contacts 81 are closed, they complete a circuit which is effective for forward biasing the control electrode of the rectifier 85 when the voltage across terminals 53 and 54 is some value other than zero. Thus, when the terminal 53 is more positive than the terminal 54, the control terminal of the rectifier 85 is forward biased over a circuit including resistor 64, diode 65, contacts 81, resistor 82 and diode 84. When the terminal 54 is more positive than the terminal 53, the control electrode of the rectifier 85 is forward biased over a circuit including resistor 71, diode 72, contracts 81, resistor 82 and diode 83.

As in the previous embodiments, if the rectifier 85 is turned on incident to closure of the contacts 81, it will remain in its high conductivity state until the voltage across the terminals 53 and 54 reaches zero volts. With the rectifier 85 energized, the junction between the diodes 65 and 72 will be maintained at approximately one volt. The Zener diode will be open circuited to prevent energization of either rectifier 60 or 62, thereby maintaining the load 50 deenergized.

It will be noted that in the embodiment of FIG. 3 a Zener diode 66 is used in place of the resistor 5 of FIG. 1. Depending upon the specific application for which the circuit is intended, either device may be used in either embodiment.

The control circuit 56 of FIG. 3 also includes Zener diodes 90 and 91 and resistors 92 and 93. The function of the diode 90 and resistor 92 is to prevent destructive heating of the rectifier 60 due to excessive current flow in the control electrode-cathode junction of rectifier 60, when the rectifier 62 is energized. When the rectifier 62 is energized, substantially all of the voltage drop from the supply voltage is across the load 50. At this time, the supply voltage is also across the resistor 71, the diodes 72, 66 and 67, the control electrode-cathode junction of the rectifier 60 and the diode 63. Only the value of the resistor 71 limits the current through this path, and the current level in the rectifier junction can cause damage to the rectifier. In order to limit the rectifier junction current to an acceptable low level, a Zener diode 90 with a selected breakdown voltage and a resistor 92 of suitable value are utilized. The junction current level will approximate the Zener breakdown value divided by the value of resistor 92.

Similarly, Zener diode 91 and resistor 93 protect the rectifier 62 against damage when the rectifier 60 is energized.

Attention is directed to the embodiment of FIGS. 1 and 2 in which the rectifier damage problem does not exist with the loads 3 and 31 connected as shown in solid lines. With these connections, the turn-on control circuits for the rectifiers are short circuited by the low impedance of the rectifiers when they are energized. Hence, very little current flows in the rectifier control electrode-cathode junctions.

In electric heater control applications, it is frequently desirable to provide a low, constant heating rate and to use the switching for periodic higher heating levels. For such applications, FIGS. 1 and 2 are especially useful because the level of the "leakage" current through the load (3, 31) when the control contacts (22, 41) are closed can be adjusted to provide the desired constant low level heating.

By changing the connection of load 3, FIG. 1, to the position shown by the broken line 3*a*, the load will be energized by half cycles of one polarity only when the contacts 22 are closed, thus lowering the low heating rate.

If, in FIG. 1, it is necessary to assure no leakage current through the load 3, the load is connected in the position shown by the broken line 3*b*. This necessitates the use of some means to prevent damage to each rectifier 1 or 2 when it is energized. As in FIG. 3, Zener diodes 100, 101 and resistors 102, 103 may be used to protect the rectifiers.

In FIG. 2, the load 31 may be positioned as shown by the broken line 31*a* for preventing leakage current therethrough. The triac 30 is protected by a resistor 104 and oppositely poled series-connected Zener diodes 105, 106.

In each of the embodiments, suitable current limiting resistors can be used in the control electrode energizing paths to prevent damage to the rectifiers, thereby eliminating the need for the Zener diode and resistor arrangements such as diodes 90, 91 and resistors 92, 93 of FIG. 3. Thus in FIG. 3, one or more current-limiting resistors 110 may be used to protect the rectifiers 60 and 62. The rectifiers of FIGS. 1 and 2 can be similarly protected.

While the invention has been particularly shown and described with reference to preferred embodiments thereof, it will be understood by those skilled in the art that the foregoing and other changes in form and details may be made therein without departing from the spirit and scope of the invention.

We claim:

1. In a power switching circuit for energizing a load of the type in which a pair of terminals is adapted for connection with an alternating-current power supply, in which first controlled rectifier means include a control circuit connected to the terminals and responsive to the alternating-current supply for causing cyclical energization of the rectifier means, in which the load is energized by the supply when the rectifier means is energized, in which the first rectifier means includes a pair of oppositely poled, parallel-connected silicon-controlled rectifiers connected in series with the load between said terminals, and in which the control circuit includes a series circuit having oppositely poled diodes with their cathodes connected together and a pair of resistors, each connecting an anode of a respective one of the diodes to a respective one of the terminals and means including an additional pair of diodes, each connecting the junction between the first-mentioned diodes to the control electrode of a respective one of the first rectifiers, the combination with the rectifier means and its control circuit of means for selectively preventing energization of the rectifier means comprising:

switch means connected to said supply terminals and to the control circuit and effective in one state thereof to permit energization of the rectifier means and effective in another state thereof to prevent energization of the rectifier means, second controlled rectifier means connected in parallel with the switch means effective when energized for preventing energization of the first rectifier means, and including a control circuit effective for energizing the second rectifier means when the switch means is in said other state, means for selectively operating the switch means alternatively in said one state or said other state, said second rectifier means remaining energized incident to a change in the switch means from said one to said other state until the supply voltage reaches approximately zero volts, thereby preventing initial energization of the first rectifier means while the supply voltage is relatively high, said switch means including a switch element having one terminal connected to the junction between the first-mentioned diodes and characterized by at least a high impedance state and a low impedance state, and means including a pair of oppositely poled, series-connected diodes having the intermediate junction connected to another terminal of the switch element and having their remote terminals connected to respective power supply terminals.

2. The combination set forth in claim 1 wherein the second rectifier means is a silicon-controlled rectifier connected in parallel with the switch element and includes a control electrode connected to one terminal of the switch element.

3. In a power switching circuit for energizing a load of the type in which a pair of terminals is adapted for connection with an alternating-current power supply, in which first controlled rectifier means include a control circuit connected to the terminals and responsive to the alternating-current supply for causing cyclical energization of the rectifier means, in which the load is energized by the supply when the rectifier means is energized, the combination with the rectifier means and its control circuit of means for selectively preventing energization of the rectifier means comprising:

switch means connected to said supply terminals and to the control circuit and effective in one state thereof to permit energization of the rectifier means and effective in another state thereof to prevent energization of the rectifier means, second controlled rectifier means connected in parallel with the switch means effective when energized for preventing energization of the first rectifier means, and including a control circuit effective for energizing the second rectifier means when the switch means is in said other state, means for selectively operating the switch means alternatively in said one state or said other state, said second rectifier means remaining energized incident to a change in the switch means from said one to said other state until the supply voltage reaches approximately zero volts, thereby preventing initial energization of the first rectifier means while the supply voltage is relatively high, said first rectifier means including a bi-directional controlled rectifier including a single control electrode, said control circuit of the bi-directional rectifier including a pair of series resistors connected between the control electrode and one of the power supply terminals, and said switch means including a switch element connecting the other power supply terminal to the junction between the resistors and characterized by at least a high impedance state and a low impedance state.

4. The combination set forth in claim 3 wherein the second rectifier means comprises:

a pair of oppositely poled, silicon-controlled rectifiers, each connected in parallel with the switch element and each having a control electrode connected to a respective one of the switch element terminals.

References Cited

UNITED STATES PATENTS

| | | | |
|---|---|---|---|
| 3,328,606 | 6/1967 | Pinckaers | 307—252 |
| 3,390,275 | 6/1968 | Baker | 307—252 |

OTHER REFERENCES

"Notes on the Application of the Silicon Controlled Rectifier," G.E. Semiconductor Product Dept., page 50.

"Applications and Circuit Design Notes," Solid State Products Inc., Bulletin D420-02, December 1959, page 27.

JOHN S. HEYMAN, Primary Examiner

B. P. DAVIS, Assistant Examiner

U.S. Cl. X.R.

307—257, 305